(12) United States Patent
Fedorkow et al.

(10) Patent No.: US 12,278,912 B2
(45) Date of Patent: *Apr. 15, 2025

(54) FACILITATING AUTHENTICATION OF ROUTING MODULES ASSOCIATED WITH ONE OR MORE NETWORK DEVICES TO ALLOW ZERO TOUCH PROVISIONING

(71) Applicant: Juniper Networks, Inc., Sunnyvale, CA (US)

(72) Inventors: Guy Fedorkow, Cambridge, MA (US); Sambasiva Rao Katta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,514

(22) Filed: Oct. 16, 2023

(65) Prior Publication Data
US 2024/0064028 A1    Feb. 22, 2024

Related U.S. Application Data

(63) Continuation of application No. 17/133,193, filed on Dec. 23, 2020, now Pat. No. 11,811,951.

(30) Foreign Application Priority Data

Jun. 30, 2020   (IN) .............................. 202041027789

(51) Int. Cl.
*H04L 9/32*       (2006.01)
*H04L 41/0668*    (2022.01)
(Continued)

(52) U.S. Cl.
CPC .......... *H04L 9/3263* (2013.01); *H04L 9/3247* (2013.01); *H04L 41/0668* (2013.01); *H04L 45/24* (2013.01); *H04L 9/50* (2022.05)

(58) Field of Classification Search
CPC . H04L 9/3263; H04L 9/3247; H04L 41/0668; H04L 45/24; H04L 9/50
See application file for complete search history.

(56) References Cited

U.S. PATENT DOCUMENTS 8,264,947 B1   9/2012  Tavares
9,762,569 B2   9/2017  Schneider
(Continued)

FOREIGN PATENT DOCUMENTS

CN   101444122 A   5/2009
CN   103718183 A   4/2014
(Continued)

OTHER PUBLICATIONS

Extended European Search Report for Application No. EP21158491.7, mailed on Jul. 2, 2021, 9 pages.
(Continued)

*Primary Examiner* — Daniel B Potratz
*Assistant Examiner* — Mayasa A. Shaawat
(74) *Attorney, Agent, or Firm* — Harrity & Harrity, LLP

(57) ABSTRACT

A network device may receive a redundant identifier certificate associated with a redundant routing module, and may provide, to a bootstrap device, a primary identifier certificate associated with a primary routing module associated with the network device. The network device may establish a secure connection with the bootstrap device based on the bootstrap device verifying an authenticity of the primary routing module via the primary identifier certificate. The network device may provide, to the bootstrap device via the secure connection, a redundant routing module identifier associated with the redundant routing module and may receive, from the bootstrap device via the secure connection, a signed certificate chain associated with the redundant routing module. The network device may verify the signed
(Continued)

certificate chain and may verify the redundant identifier certificate, associated with the redundant routing module, based on verifying the signed certificate chain.

20 Claims, 13 Drawing Sheets

(51) Int. Cl.
*H04L 45/24* (2022.01)
*H04L 9/00* (2022.01)

(56) References Cited

U.S. PATENT DOCUMENTS

| | | | |
|---|---|---|---|
| 10,791,118 B2* | 9/2020 | Konda | H04L 63/0876 |
| 2002/0194483 A1 | 12/2002 | Wenocur et al. | |
| 2005/0226144 A1* | 10/2005 | Okita | H04L 45/00 370/251 |
| 2011/0119400 A1* | 5/2011 | Manion | H04L 45/54 709/242 |
| 2013/0031371 A1 | 1/2013 | McLellan et al. | |
| 2014/0122674 A1 | 5/2014 | Gray et al. | |
| 2015/0271122 A1 | 9/2015 | Jalisatgi et al. | |
| 2018/0063714 A1 | 3/2018 | Stephenson | |
| 2020/0204538 A1* | 6/2020 | Friel | H04L 63/0876 |
| 2021/0409231 A1 | 12/2021 | Fedorkow et al. | |

FOREIGN PATENT DOCUMENTS

| | | |
|---|---|---|
| CN | 104704789 A | 6/2015 |
| CN | 107111710 A | 8/2017 |
| CN | 111064573 A | 4/2020 |
| KR | 20060063549 A | 6/2006 |
| WO | 2007117461 A2 | 10/2007 |
| WO | 2016040506 A1 | 3/2016 |

OTHER PUBLICATIONS

Watsen, K., et al., Secure Zero Touch Provisioning (SZTP), Internet Engineering Task Force (IETF), Standards Track : ISSN: 2070-1721, Apr. 2019, pp. 1-87.

Jia, S., "Internet Domain Name System Operation Research on Safety Monitoring and Analysis System Research," Modern Telecommunications Technology, 04, 2015, 6 pages.

Zhixian, S., "Wireless Mesh Network Research on Secure Routing Protocols," Journal of Xiamen University (Natural Science Version),06, 2008, 5 pages.

* cited by examiner

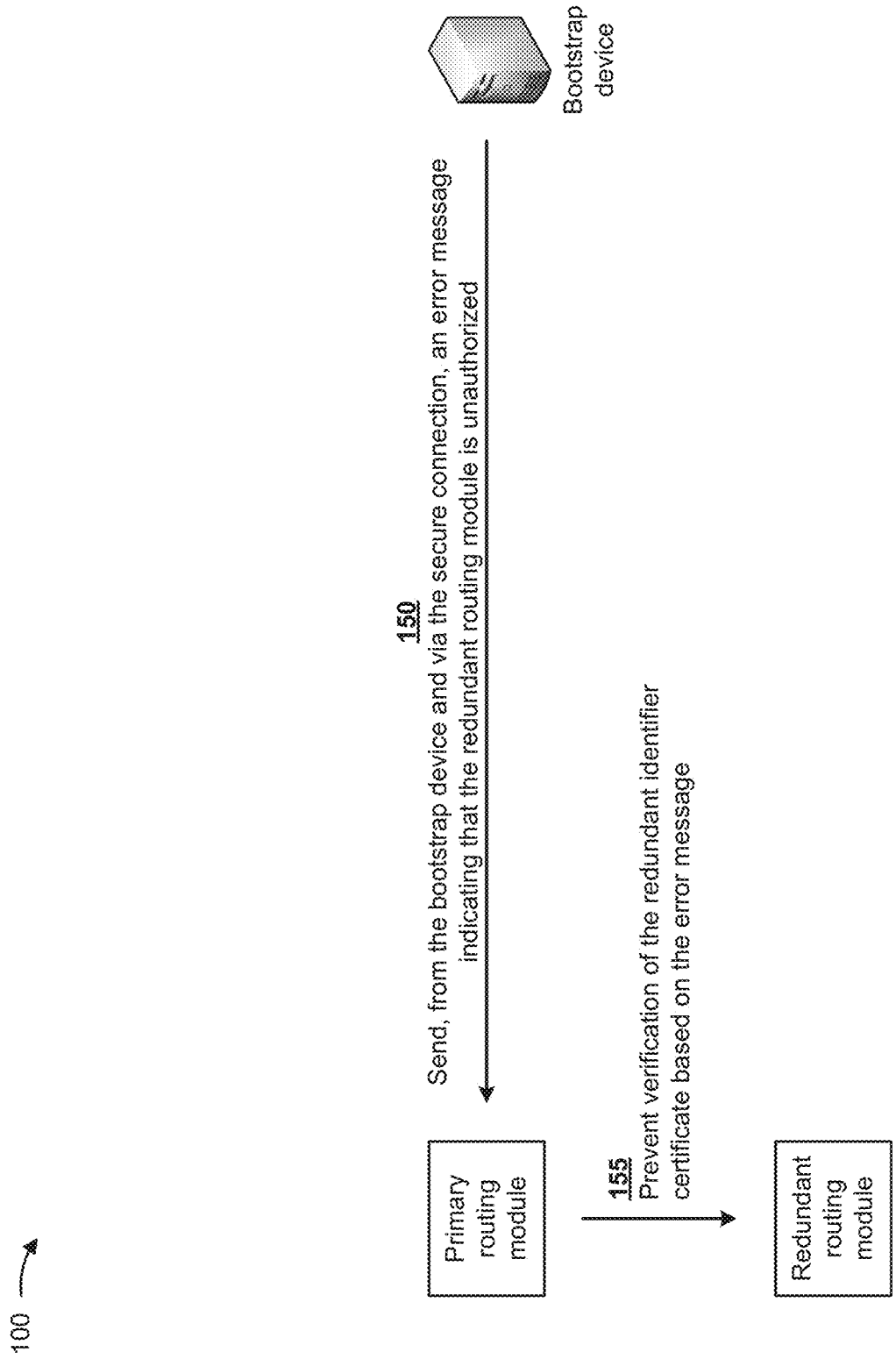

FACILITATING AUTHENTICATION OF ROUTING MODULES ASSOCIATED WITH ONE OR MORE NETWORK DEVICES TO ALLOW ZERO TOUCH PROVISIONING

CROSS-REFERENCE TO RELATED APPLICATION

This application is a continuation of U.S. patent application Ser. No. 17/133,193, filed Dec. 23, 2020, which claims priority to India Patent Application No. 202041027789, entitled "FACILITATING AUTHENTICATION OF ROUTING MODULES ASSOCIATED WITH ONE OR MORE NETWORK DEVICES TO ALLOW ZERO TOUCH PROVISIONING," filed on Jun. 30, 2020, the contents of which are incorporated herein by reference in their entireties.

BACKGROUND

Zero Touch Provisioning (ZTP) is a technique to provision a network device when the network device is booting in a factory-default state. Provisioning may include updating the boot image, establishing an initial configuration, and executing arbitrary scripts to address auxiliary needs. Once provisioned, the network device is able to establish connections with other network devices.

A virtual chassis is a group of network devices that are connected together to form a single logical network device. The group of network devices may be connected via respective virtual chassis interfaces that are configured to transmit virtual chassis specific control traffic between network devices of the group of network devices.

SUMMARY

In some implementations, a method includes receiving, by a primary routing module, a redundant identifier certificate associated with a redundant routing module; establishing, by the primary routing module, a secure connection with the bootstrap device; providing, by the primary routing module and to the bootstrap device via the secure connection, a redundant routing module identifier associated with the redundant routing module; and selectively: receiving, by the primary routing module and from the bootstrap device via the secure connection, an error message indicating that the redundant routing module is unauthorized; or receiving, by the primary routing module and from the bootstrap device via the secure connection, a signed certificate chain associated with a network device that includes the redundant routing module, verifying, by the primary routing module, the signed certificate chain, and verifying, by the primary routing module, the redundant identifier certificate, associated with the redundant routing module, based on verifying the signed certificate chain.

In some implementations, a network device includes one or more memories; and one or more processors to: receive a redundant identifier certificate associated with a redundant routing module; establish a secure connection with a bootstrap device; provide, to the bootstrap device via the secure connection, a redundant routing module identifier associated with the redundant routing module; and selectively: receive, from the bootstrap device via the secure connection, an error message indicating that the redundant routing module is unauthorized; or receive, from the bootstrap device via the secure connection, a signed certificate chain associated with the redundant routing module, verify the signed certificate chain, and verify the redundant identifier certificate, associated with the redundant routing module, based on verifying the signed certificate chain.

In some implementations, a non-transitory computer-readable medium storing instructions includes one or more instructions that, when executed by one or more processors of a first network device and a second network device that form a virtual chassis, cause the one or more processors to: receive a redundant identifier certificate associated with the second network device; establish a secure connection with a bootstrap device; provide, to the bootstrap device via the secure connection, a redundant routing module identifier associated with the second network device; and selectively: receive, from the bootstrap device via the secure connection, an error message indicating that the second network device is unauthorized; or receive, from the bootstrap device via the secure connection, a signed certificate chain associated with the second network device, verify the signed certificate chain, and verify the redundant identifier certificate, associated with the second network device, based on verifying the signed certificate chain.

BRIEF DESCRIPTION OF THE DRAWINGS

FIGS. 1A-1G are diagrams of an example implementation described herein.

DETAILED DESCRIPTION

Figure 1A:
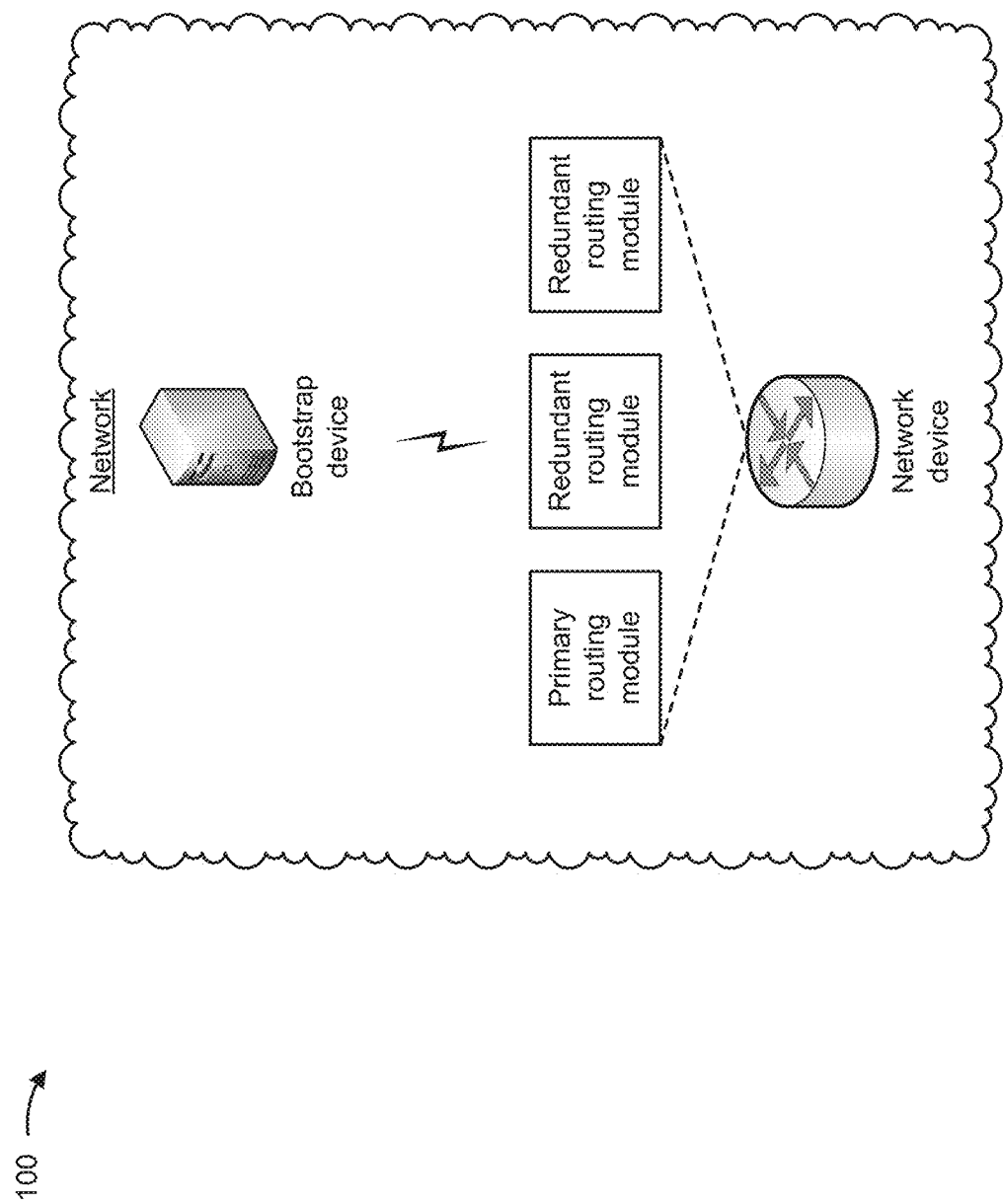

The following detailed description of example implementations refers to the accompanying drawings. The same reference numbers in different drawings may identify the same or similar elements.

Zero Touch Provisioning (ZTP) may be useful for provisioning network devices upon deployment from a factory-default state. Network operators that deploy network devices configured for ZTP may reduce errors in the installation process by allowing the provisioning process to be automated and may reduce costs of manually provisioning the network devices by on-site operators. When a network device is coupled to power, the network device may communicate with a bootstrap device to obtain bootstrap information (also referenced as "provisioning information") for provisioning the network device.

In some cases, a network device and/or a virtual chassis (e.g., a group of network devices that are connected together to form a single logical network device) may include a primary routing module and one or more redundant routing modules. ZTP allows a network device that includes the primary routing module to communicate with the bootstrap device to provision the primary routing module with bootstrap information. As part of the ZTP process, the bootstrap device may communicate with the network device that includes the primary routing module to verify an authenticity of the primary routing module (e.g., authenticate the primary routing module as a verified recipient of the bootstrap information) before providing the bootstrap information to the primary routing module.

However, in many cases, the bootstrap device is not able to directly communicate with the network device(s) that comprise the one or more redundant routing modules to verify an authenticity of the one or more redundant routing modules. In such situations, the primary routing module forwards the bootstrap information to the one or more redundant routing modules to provision the one or more redundant routing modules with the bootstrap information, even though the bootstrap device is not able to verify an authenticity of the one or more redundant routing modules. In some cases, this allows a bad actor to spoof or mimic a redundant routing module, which allows the bad actor to obtain the bootstrap information from the primary routing module. Accordingly, the bad actor may target the network device(s) with malicious attacks (e.g., that change or adjust one or more security settings of the network device(s) to compromise the network device(s), such as by stealing virtual private network (VPN) keys associated with the network device(s)). This may impact a performance of the network device(s), which may cause the network device(s) to waste computing resources (e.g., processing resources, memory resources, networking resources, and/or the like) to identify and/or investigate the malicious attacks and/or rectify any damage that may result from the malicious attacks.

Some implementations described herein provide a primary routing module that is able to verify an authenticity of one or more redundant routing modules before allowing the redundant routing modules to be provisioned with bootstrap information. In some implementations, the primary routing module may obtain a redundant identifier certificate associated with a redundant routing module and send a redundant routing module identifier to a bootstrap device. The bootstrap device may identify the redundant routing module based on the redundant routing module identifier and determine that the redundant routing module is authorized to receive the bootstrap information. The bootstrap device may send a signed certificate chain (e.g., a signed trust anchor certificate) associated with a network device that includes the redundant routing module to the primary routing module. The primary routing module may verify the signed certificate chain and may use the signed certificate chain to verify an authenticity of the redundant routing module. Accordingly, after verifying the authenticity of the redundant routing module, the primary routing module may send the bootstrap information to the redundant routing module to allow the redundant routing module to be provisioned with the bootstrap information.

In this way, the primary routing module and/or the bootstrap device facilitate authentication of the one or more redundant routing modules and thereby improve security associated with provisioning the one or more redundant routing modules with bootstrap information. This may reduce a likelihood that any network device associated with the primary routing module and/or the one or more redundant routing modules will be subject to malicious attacks by bad actors (e.g., that attempt to spoof and/or mimic redundant routing modules). This conserves computing resources (e.g., processing resources, memory resources, networking resources, and/or the like) of a network device that would otherwise be expended to identify and/or investigate the malicious attacks and/or rectify any damage that may result from the malicious attacks.

FIGS. 1A-1G are diagrams of one or more example implementations 100 described herein. As shown in FIG. 1A, an environment associated with example implementation(s) 100 may include a network device and/or a bootstrap device. The network device may include a primary routing module and one or more redundant routing modules. In some implementations, a redundant routing module may be associated with a line card or another component of the network device. The network device and/or the bootstrap device may be included in a network, such as a cellular network, a local area network (LAN), a core network, an access network, a wide area network (WAN) such as the Internet, a cloud network, and/or the like.

Figure 1B:
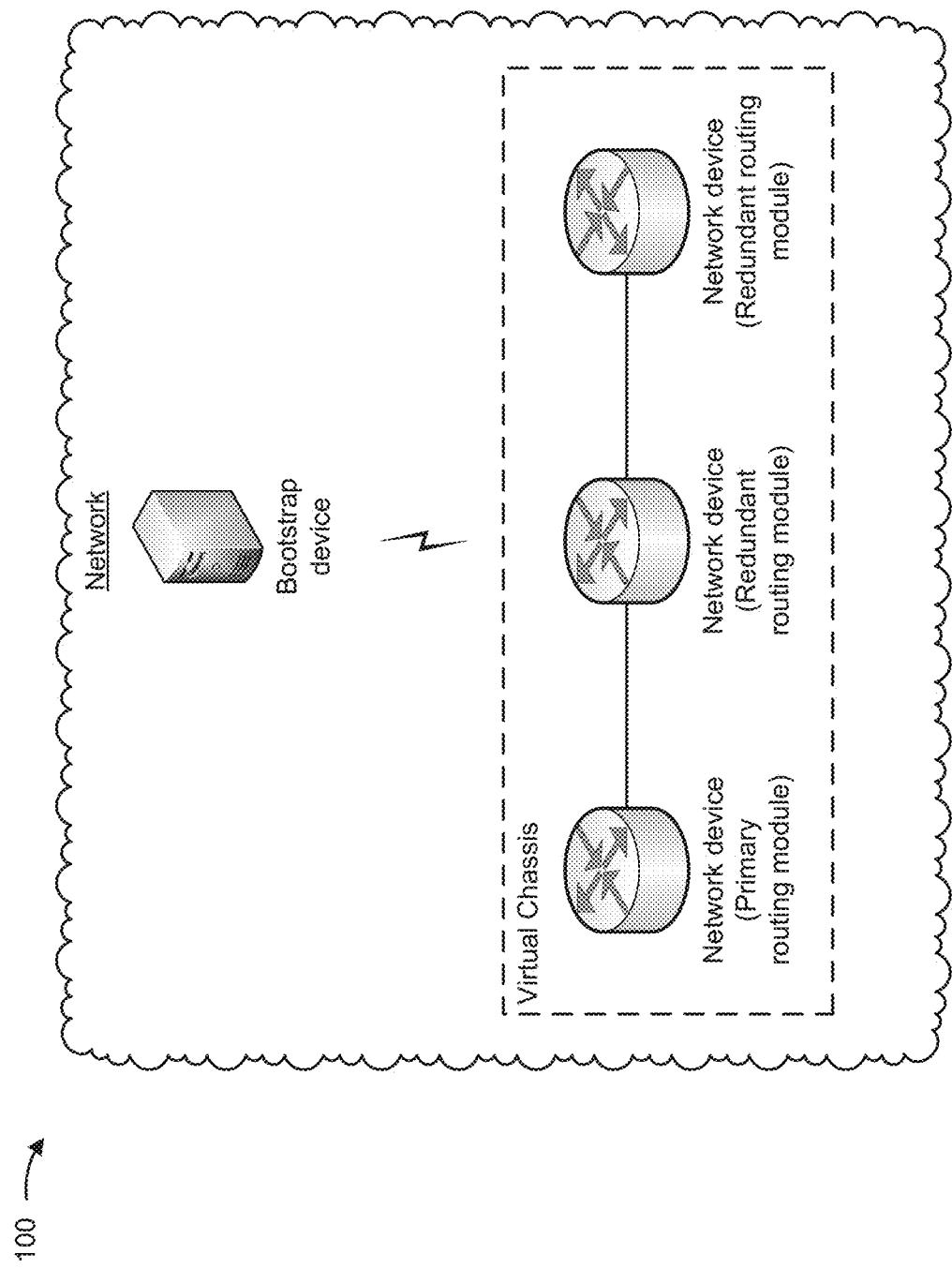

As shown in FIG. 1B, an environment associated with example implementation(s) 100 may include a virtual chassis (e.g., a representation of a plurality of network devices as a single logical network device) and/or the bootstrap device. The virtual chassis may include a primary routing module and one or more redundant routing modules (e.g., distributed across the plurality of network devices that comprise the virtual chassis). In some implementations, the plurality of network devices may be connected to each other via one or more connections (e.g., via direct connections, via indirect connections, and/or the like). Additionally, or alternatively, a particular network device (e.g., the network device that includes the primary routing module) may be connected to the bootstrap device (e.g., via a direct connection and/or an indirect connection). In some implementations, the plurality of network devices and/or the bootstrap device may be included in a network.

As further described herein, the bootstrap device may facilitate verifying an authenticity of a primary routing module and one or more redundant routing modules, regardless of whether the primary routing module and the one or more redundant routing modules are included in a single network device or distributed across a plurality of network devices, such as in a virtual chassis. Accordingly, the description provided herein in relation to FIGS. 1C-1G applies to the environment described in relation to FIG. 1A as well as the environment described in relation to FIG. 1B.

Figure 1C:
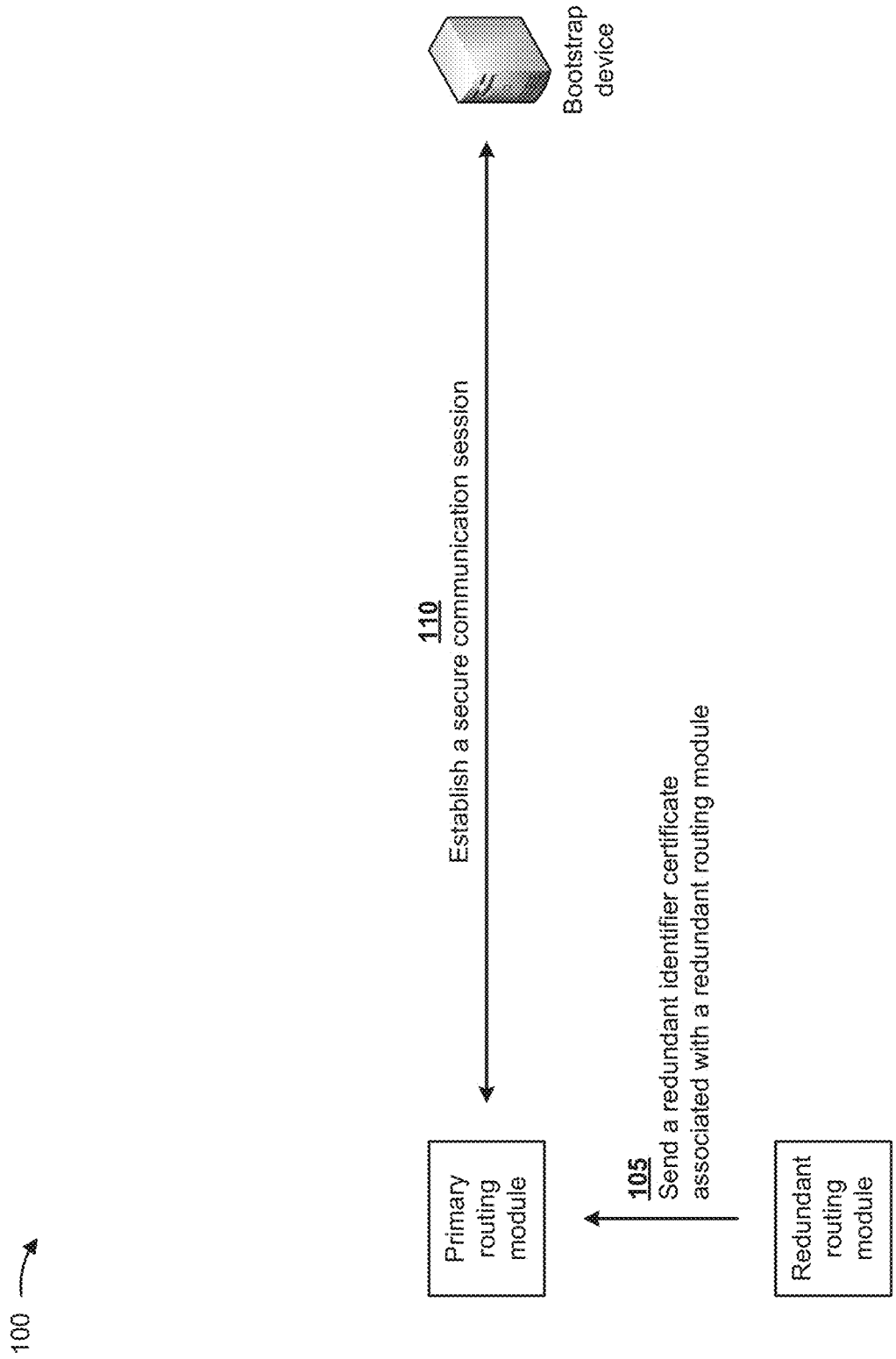

As shown in FIG. 1C, and by reference number 105, a redundant routing module may send a redundant identifier certificate to a primary routing module. For example, the redundant routing module and/or the primary routing module may establish a connection (e.g., a communication session) between the redundant routing module and the primary routing module to allow the redundant routing module to send the redundant identifier certificate to the primary routing module. In some implementations, the connection may be a secure connection, such as a secure sockets layer (SSL) connection, between the redundant routing module and the primary routing module. The redundant routing module may send the redundant identifier certificate to the primary routing module when a network device that includes the redundant routing module is powered on, when the network device that includes the redundant routing module is added to a network, when the network device that includes the redundant routing module is connected to a network device that includes the primary routing module, and/or the like.

The redundant identifier certificate may include a secure device identifier (DevID) and/or another type of identifier that identifies the redundant routing module. In some implementations, the redundant identifier certificate may be issued by a certificate authority (CA) and/or another type of security credential generating device.

As further shown in FIG. 1C, and by reference number 110, the primary routing module and/or the bootstrap device may establish a secure connection between the primary routing module and the bootstrap device. In some implementations, the secure connection may be an SSL connection between the primary routing module and the bootstrap device.

In some implementations (e.g., as part of establishing a secure connection between the primary routing module and the bootstrap device) the bootstrap device may verify an authenticity of the primary routing module based on a primary identifier certificate of the primary routing module. The primary identifier certificate may include a DevID or another type of identifier that identifies the primary routing module. In some implementations, the primary identifier certificate may be issued by a CA and/or another type of security credential generating device. For example, the primary routing module may send the primary identifier certificate to the bootstrap device and the bootstrap device may process the primary identifier certificate (e.g., using a certificate chain, such as a trust anchor certificate chain, associated with the CA) to verify that primary identifier certificate is associated with the primary routing module (e.g., that the primary identifier certificate identifies the primary routing module).

Figure 1D:
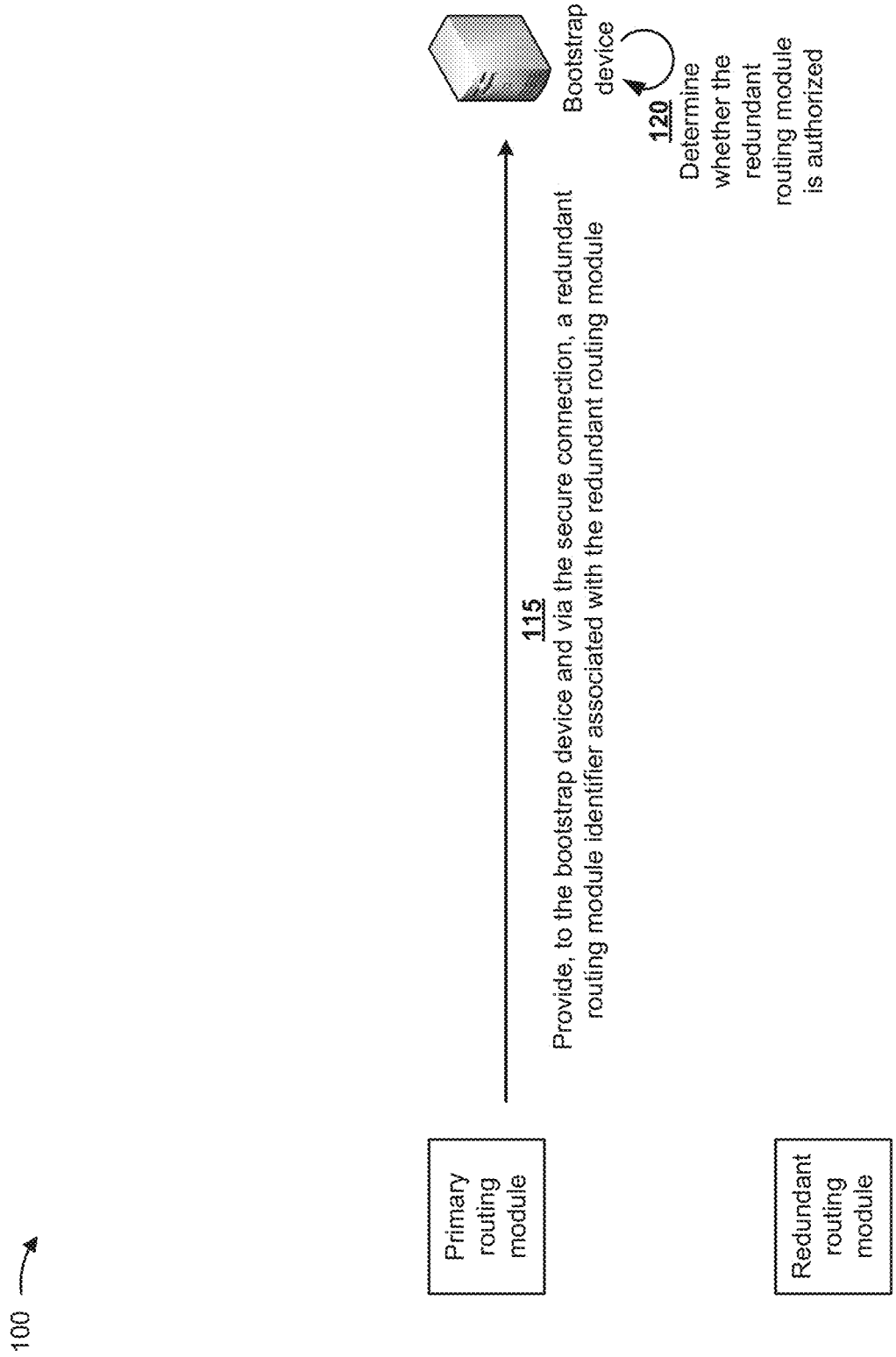

As shown in FIG. 1D, and by reference number 115, the primary routing module may provide a redundant routing module identifier to the bootstrap device. The redundant routing module identifier may be the redundant identifier certificate and/or another type of identifier that identifies the redundant routing module (e.g., a serial number, a text string, and/or the like associated with the redundant routing module). For example, the primary routing module may send the redundant routing module identifier to the bootstrap device via the secure connection between the primary routing module and the bootstrap device.

As further shown in FIG. 1D, and by reference number 120, the bootstrap device may determine whether the redundant routing module is authorized (e.g., to receive bootstrap information). In some implementations, the bootstrap device may determine, based on the redundant routing module identifier, whether the redundant routing module is associated with a certificate chain (e.g., a trust anchor certificate chain). For example, the bootstrap device may search, based on the redundant routing module identifier, a data structure (e.g., that is included in the bootstrap device or accessible to the bootstrap device) that includes a plurality of certificate chains to identify a certificate chain associated with the redundant routing module.

In some implementations, the redundant routing module may be associated with a certificate chain when the certificate chain is associated with a network device that includes the redundant routing module. In some implementations, the certificate chain may be associated with the network device when the certificate chain is a signed certificate chain (e.g., a signed trust anchor certificate chain) signed by the network device. The network device may sign the certificate chain using a private key associated with the network device, using an owner certificate associated with the network device, and/or the like When the bootstrap device successfully identifies a certificate chain associated with the redundant routing module (e.g., identifies a signed certificate chain signed by the network device that includes the redundant routing module), the bootstrap device may determine that the redundant routing module is authorized. The bootstrap device and/or the primary routing module may therefore perform one or more functions described herein in relation to FIGS. 1E-1F. Alternatively, when the bootstrap device fails to identify a certificate chain associated with the redundant routing module, the bootstrap device may determine that the redundant routing module is unauthorized. The bootstrap device and/or the primary routing module may therefore perform one or more functions described herein in relation to FIG. 1G.

Figure 1E:
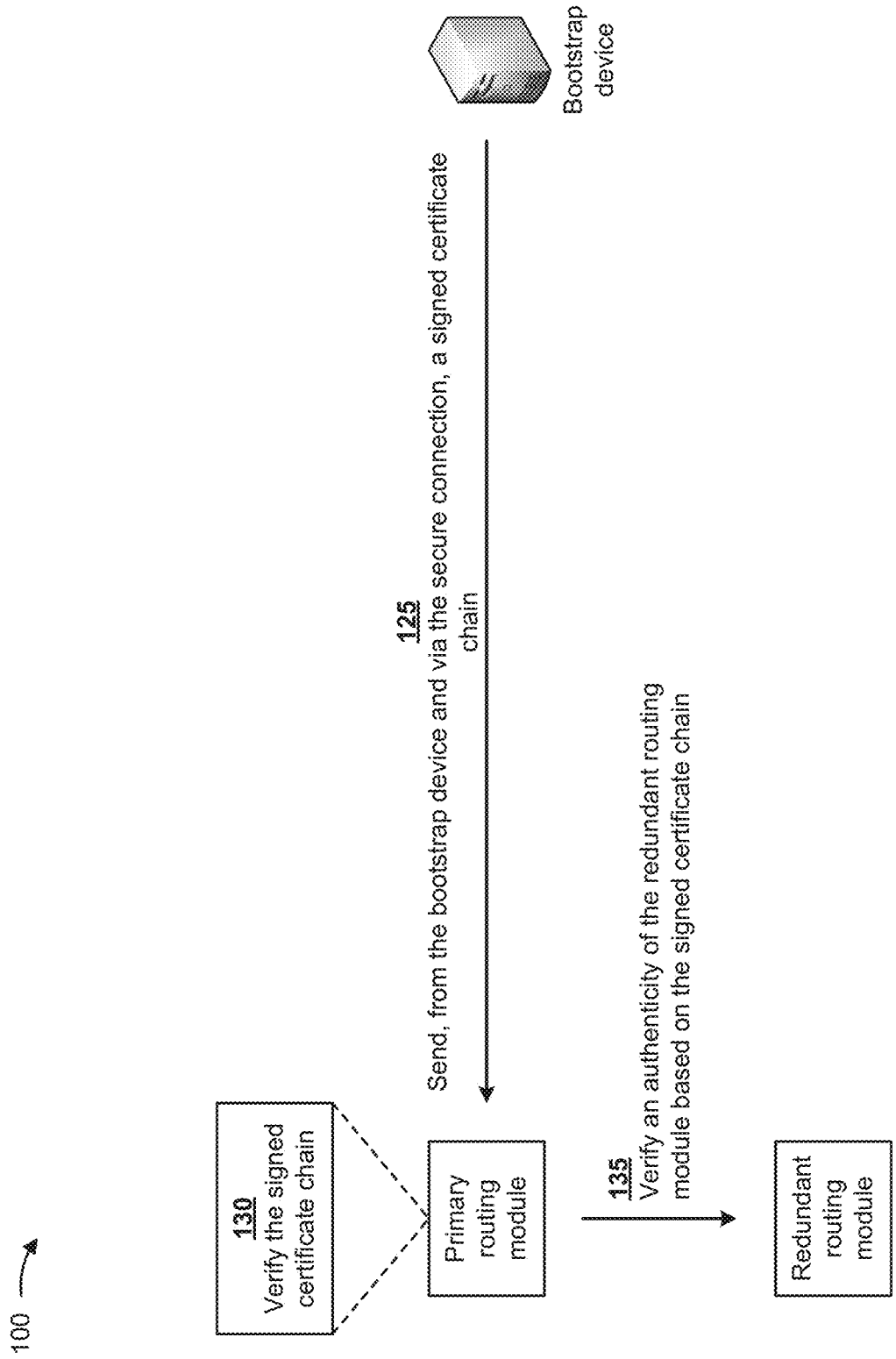

As shown in FIG. 1E, and by reference number 125, the bootstrap device may send the certificate chain associated with the redundant routing module to the primary routing module. For example, the bootstrap device may send the signed certificate chain signed by the network device (that includes the redundant routing module) to the primary routing module via the secure connection between the primary routing module and the bootstrap device.

As further shown in FIG. 1E, and by reference number 130, the primary routing module may verify the signed certificate chain (e.g., determine that the signed certificate chain originated from the network device). For example, the primary routing module may verify a signature of the network device included in the signed certificate chain by using a public key associated with the network device (e.g., to verify that the signed certificate chain was signed using the private key associated with the network device), by using an ownership voucher associated with the network device (e.g., to verify that the signed certificate chain was signed using the owner certificate associated with the network device), and/or the like.

As further shown in FIG. 1E, and by reference number 135, the primary routing module (e.g., after verifying the signed certificate chain) may verify an authenticity of the redundant routing module. For example, the primary routing module may process the redundant identifier certificate using the signed certificate chain to verify that the redundant identifier certificate is associated with the redundant routing module (e.g., that the redundant identifier certificate identifies the redundant routing module). In some implementations, the primary routing module may establish a new connection (e.g., a secure connection, such as an SSL connection) with the redundant routing module to re-obtain the redundant identifier certificate to all the primary routing module to verify that the redundant identifier certificate is associated with the redundant routing module.

Figure 1F:
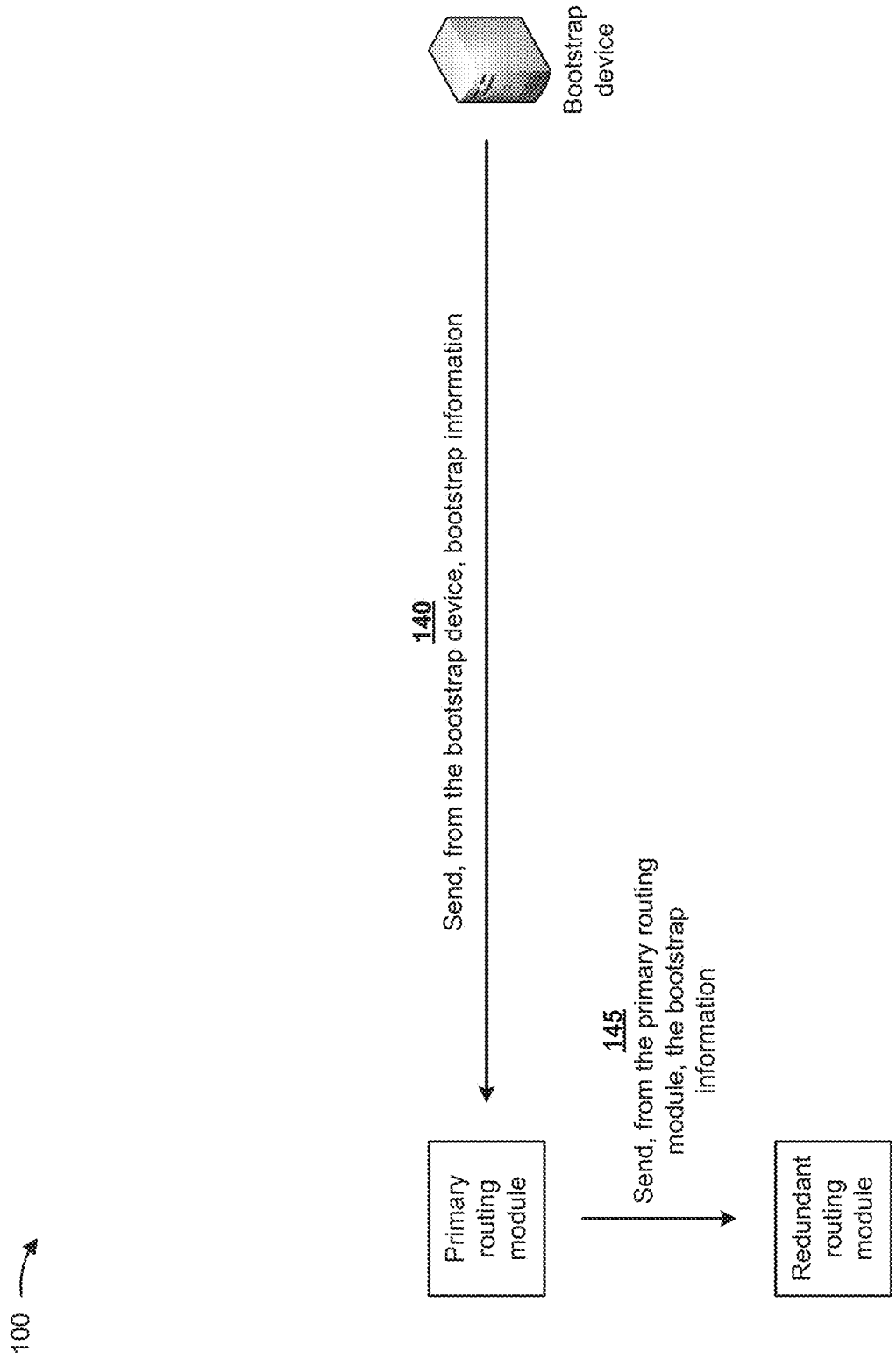

As shown in FIG. 1F, and by reference number 140, the bootstrap device may send bootstrap information associated with a network to the primary routing module (e.g., after the bootstrap device verifies the authenticity of the of the primary routing module). For example, the bootstrap device may send the bootstrap information to the primary routing module via the secure connection between the primary routing module and the bootstrap device. In this way, the primary routing module may be provisioned with the bootstrap information.

As further shown in FIG. 1F, and by reference number 145, the primary routing module may send the bootstrap information to the redundant routing module (e.g., after the primary routing module verifies the authenticity of the redundant routing module). For example, the primary routing module may send the bootstrap information to the redundant routing module via the connection between the primary routing module and the redundant routing module. In this way, the redundant routing module may be provisioned with the bootstrap information.

After the primary routing module and the redundant routing module are provisioned with the bootstrap information, the primary routing module may perform one or more functions (e.g., one or more routing functions) based on the bootstrap information. In some implementations, the primary routing module and/or the redundant routing module may determine that the primary routing module is or is about to become nonoperational. For example, the network device that includes the primary routing module may need to perform a reboot procedure to address an operational error, which may cause the primary routing module to go offline for a period of time. Accordingly, the primary routing module and/or the redundant routing module may cause the redundant routing module to perform the one or more functions until the primary routing module becomes operational again (e.g., until the network device that includes the primary routing module comes online again).

Alternatively, as shown in FIG. 1G, and by reference number 150, the bootstrap device may send (e.g., after determining that the redundant routing module is unauthorized, as described herein in relation to FIG. 1D and reference number 120) an error message indicating that the redundant routing module is unauthorized. For example, the bootstrap device may send the error message to the primary routing module via the secure connection between the primary routing module and the bootstrap device. Accordingly, as further shown in FIG. 1G and by reference number 155, the primary routing module (e.g., based on receiving the error message) may prevent verifying the authenticity of the redundant routing module (e.g., may prevent verification of the redundant identifier certificate) based on the error message and/or may prevent the redundant routing module from being provisioned with the bootstrap information.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
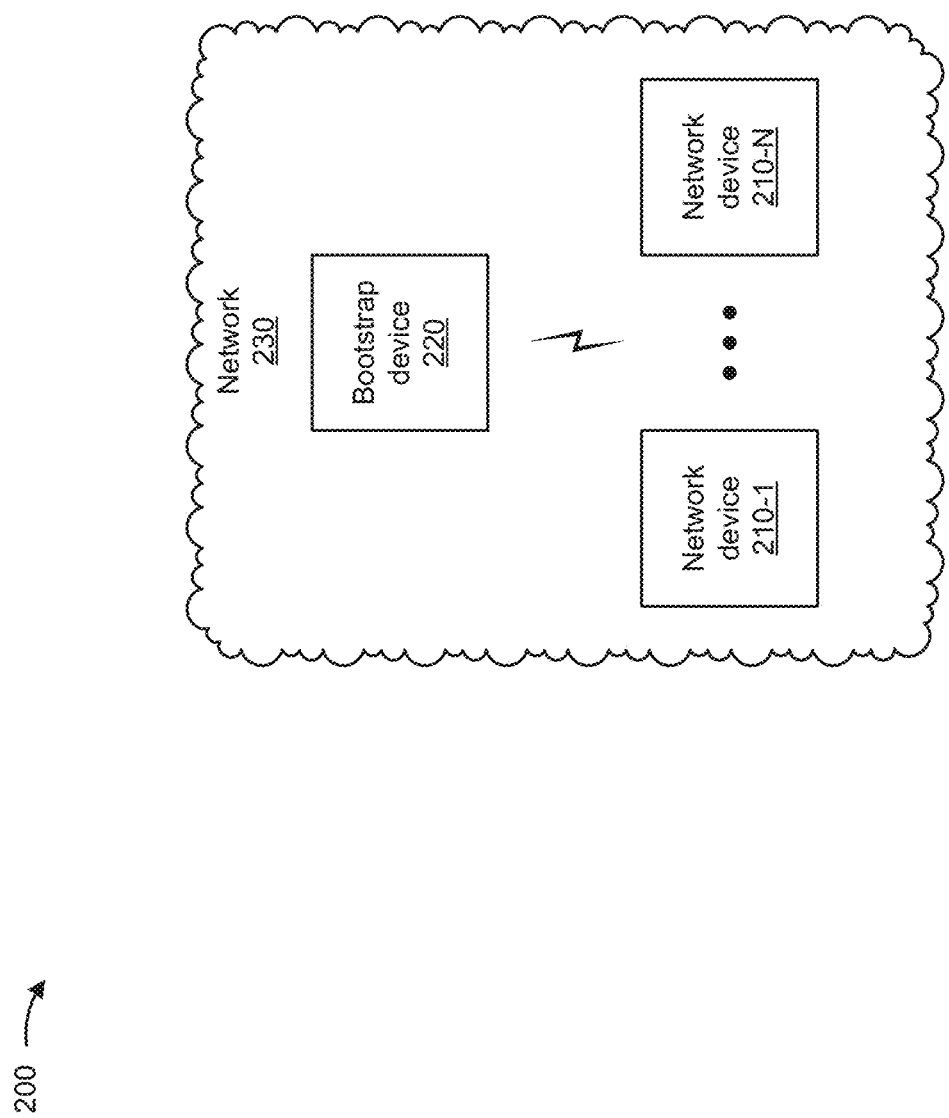
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a plurality of network devices 210 (e.g., network device 210-1 through network device 210-N, referred to collectively as "network devices 210" and singularly as "network device 210"), a bootstrap device 220, and a network 230. Devices of environment 200 may interconnect via wired connections, wireless connections, or a combination of wired and wireless connections.

Network device 210 includes one or more devices capable of receiving, storing, generating, processing, forwarding, and/or transferring information in a manner described herein. For example, network device 210 may include a firewall, a router, a gateway, a switch, a hub, a bridge, a reverse proxy, a server (e.g., a proxy server), a security device, an intrusion detection device, a load balancer, or a similar type of device. In some implementations, network device 210 may be a physical device implemented within a housing, such as a chassis. In some implementations, network device 210 may be a virtual device implemented by one or more computer devices of a cloud computing environment or a data center. In some implementations, network device 210 may include a primary routing module and/or one or more redundant routing modules.

Bootstrap device 220 includes one or more devices capable of storing, processing, and/or routing information, such as information described herein. In some implementations, bootstrap device 220 may include a communication interface that allows bootstrap device 220 to receive information from and/or transmit information to network device 210. In some implementations, bootstrap device 220 may be a server device, a DHCP server device, a data storage device, or a similar device. In some implementations, bootstrap device 220 may include and/or maintain a data structure that includes a plurality of certificate chains.

Network 230 includes one or more wired and/or wireless networks. For example, network 230 may include a cellular network (e.g., a long-term evolution (LTE) network, a 2G network, a 5G network, a New Radio (NR) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), an Ethernet network, a VPN (E.g., a VPLS, an EVPN, a VPWS, an L2VPN, an L4VPN, and/or the like), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
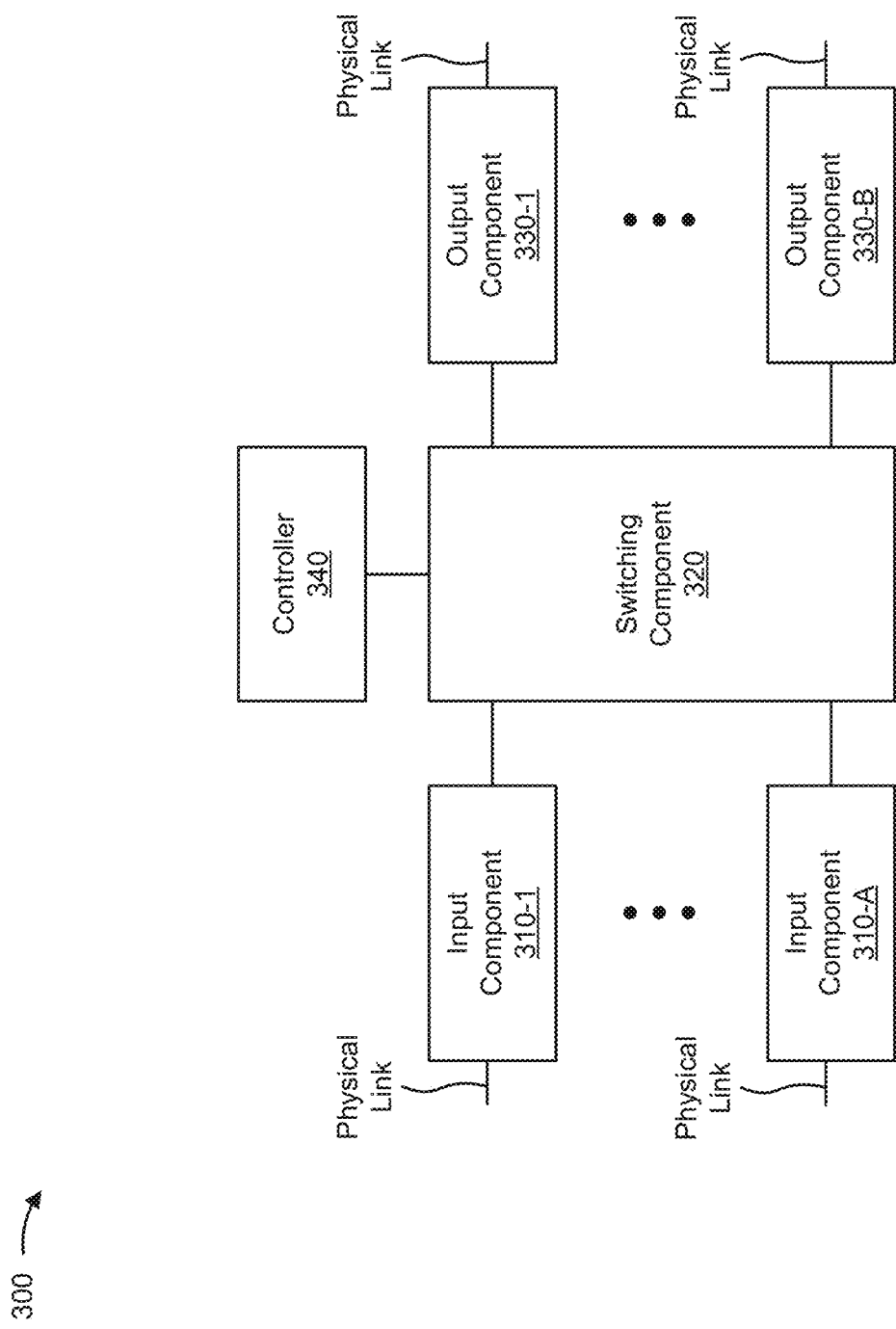
FIGS. 3-4 are diagrams of example components of one or more devices of FIG. 2.

FIG. 3 is a diagram of example components of a device 300. Device 300 may correspond to network device 210, bootstrap device 220, and/or the like. In some implementations, network device 210, bootstrap device 220, and/or the like, may include one or more devices 300 and/or one or more components of device 300. As shown in FIG. 3, device 300 may include one or more input components 310-1 through 310-A (A≥1) (hereinafter referred to collectively as input components 310, and individually as input component 310), a switching component 320, one or more output components 330-1 through 330-B (B≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 340 may include one or more processors that can be programmed to perform a function.

In some implementations, controller 340 may include a RAM, a ROM, and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
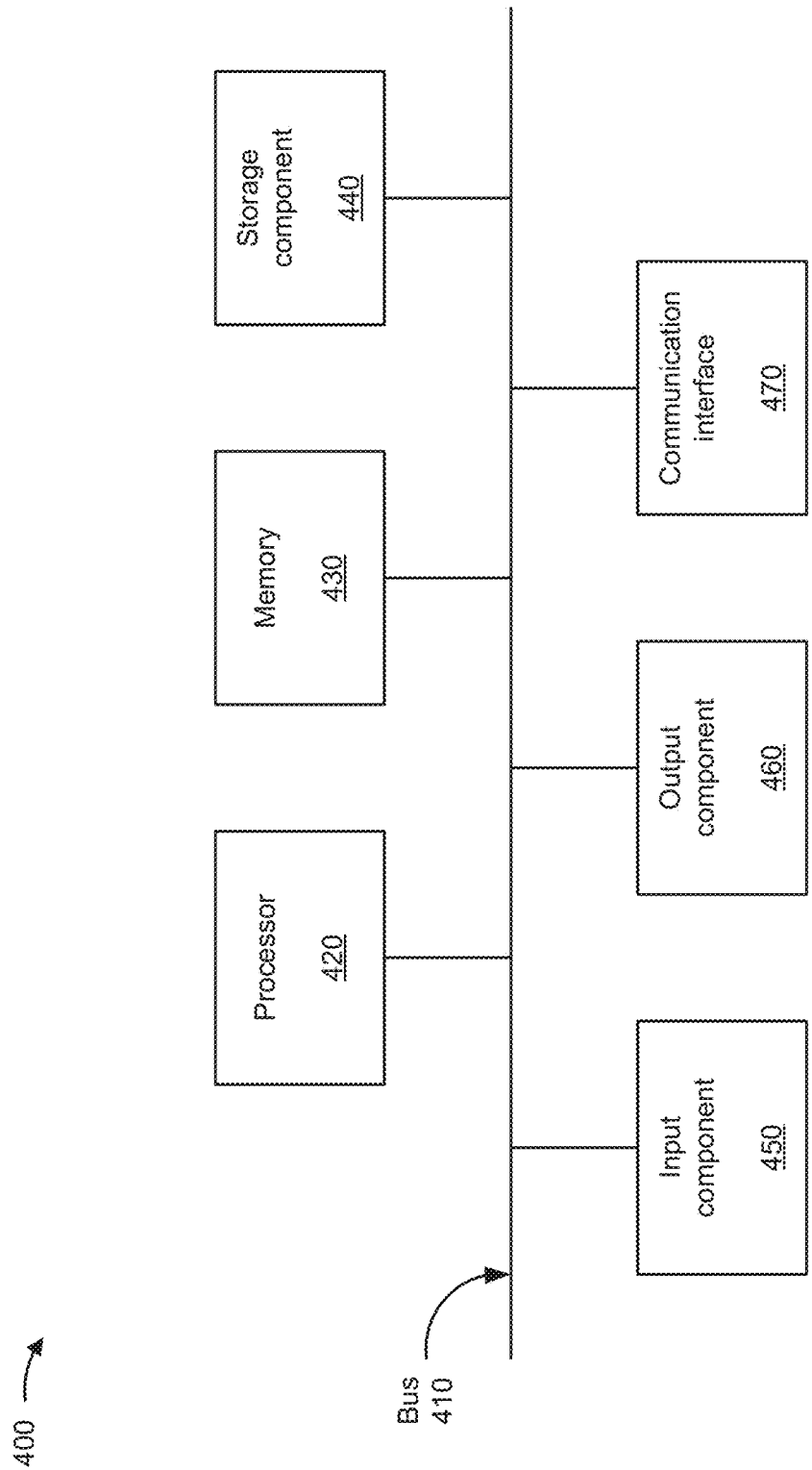

FIG. 4 is a diagram of example components of a device 400, which may correspond to network device 210, bootstrap device 220, and/or the like. In some implementations, network device 210, bootstrap device 220, and/or the like may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication interface 470 enables device 400 to communicate with other devices, such as via a wired connection and/or a wireless connection. For example, communication interface 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
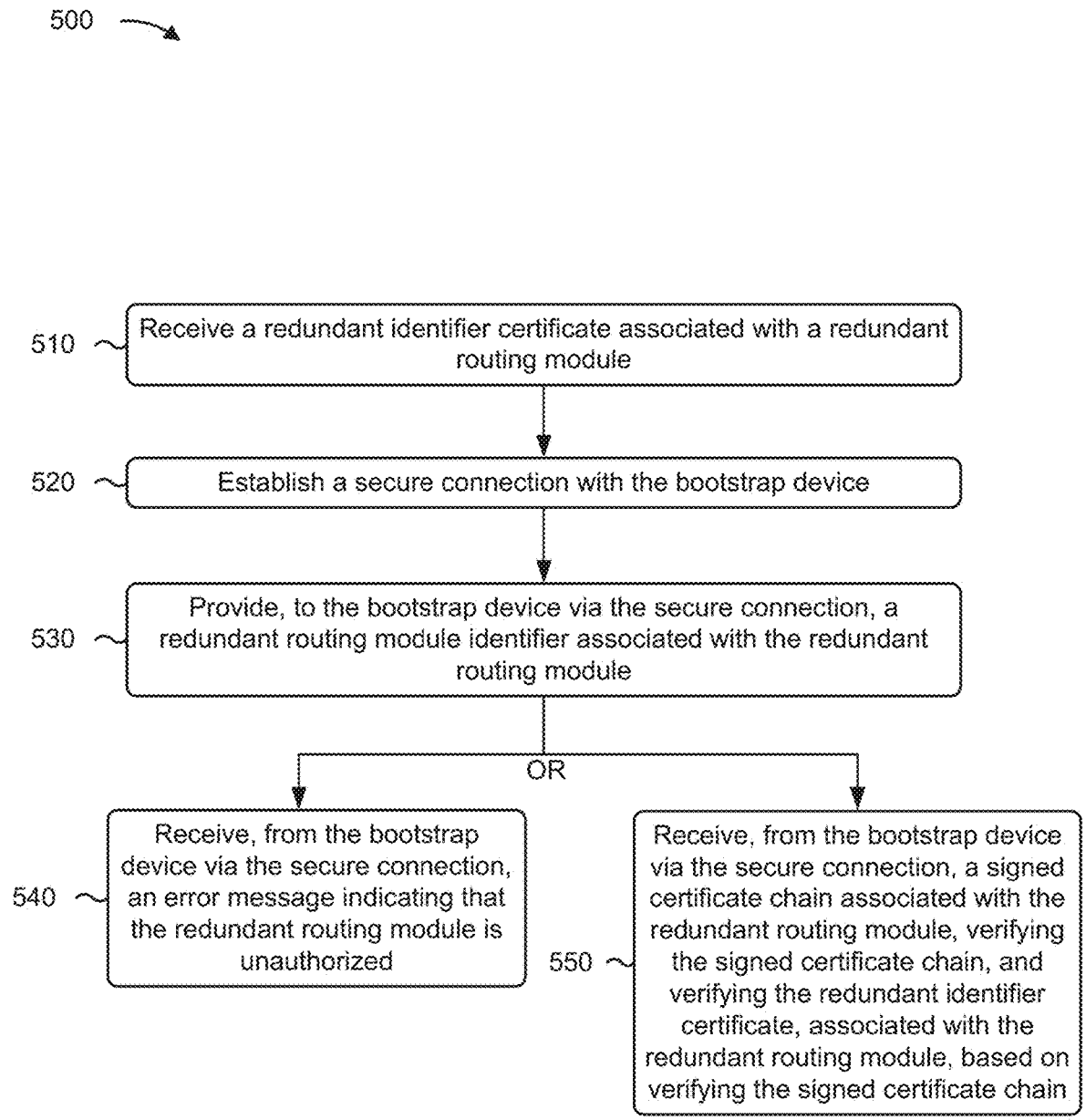
FIGS. 5-7 are flow charts of example processes relating to facilitating authentication of routing modules associated with one or more network devices to allow zero touch provisioning.

FIG. 5 is a flow chart of an example process 500 associated with facilitating authentication of routing modules associated with one or more network devices to allow zero touch provisioning. In some implementations, one or more process blocks of FIG. 5 may be performed by a network device (e.g., network device 210-1). In some implementations, one or more process blocks of FIG. 5 may be performed by another device or a group of devices separate from or including the network device, such as another network device (e.g., network device 210-2, network device 210-N, and/or the like), a bootstrap device (e.g., bootstrap device 220), and/or the like. Additionally, or alternatively, one or more process blocks of FIG. 5 may be performed by one or more components of a device 300, such as input component 310, switching component 320, output component 330, controller 340, and/or the like; a device 400, such as processor 420, memory 430, storage component 440, input component 450, output component 460, communication interface 470, and/or the like; and/or the like.

As shown in FIG. 5, process 500 may include receiving a redundant identifier certificate associated with a redundant routing module (block 510). For example, the network device may receive a redundant identifier certificate associated with a redundant routing module, as described above.

As further shown in FIG. 5, process 500 may include establishing a secure connection with the bootstrap device (block 520). For example, the network device may establish a secure connection with the bootstrap device, as described above.

As further shown in FIG. 5, process 500 may include providing, to a bootstrap device via the secure connection, the redundant routing module identifier associated with the redundant routing module (block 530). For example, the network device may provide, to the bootstrap device via the secure connection, a redundant routing module identifier associated with the redundant routing module, as described above.

As further shown in FIG. 5, process 500 may include selectively receiving, from the bootstrap device via the secure connection, an error message indicating that the redundant routing module is unauthorized (block 540). For example, the network device may selectively receive, from the bootstrap device via the secure connection, an error message indicating that the redundant routing module is unauthorized.

Alternatively, as further shown in FIG. 5, process 500 may include selectively receiving, from the bootstrap device via the secure connection, a signed certificate chain associated with a network device that includes the redundant routing module, verifying the signed certificate chain, and verifying the redundant identifier certificate, associated with the redundant routing module, based on verifying the signed certificate chain (block 550). For example, the network device may selectively receive, from the bootstrap device via the secure connection, a signed certificate chain associated with a network device that includes the redundant routing module, verifying the signed certificate chain, and verifying the redundant identifier certificate, associated with the redundant routing module, based on verifying the signed certificate chain, as described above.

Process 500 may include additional implementations, such as any single implementation or any combination of implementations described below and/or in connection with one or more other processes described elsewhere herein.

In a first implementation, process 500 includes the redundant routing module from being provisioned with bootstrap information when the error message is received from the bootstrap device.

In a second implementation, alone or in combination with the first implementation, process 500 includes sending, after verifying the redundant identifier certificate, bootstrap information to the redundant routing module.

In a third implementation, alone or in combination with one or more of the first and second implementations, the primary routing module and the redundant routing module are included in a single network device.

In a fourth implementation, alone or in combination with one or more of the first through third implementations, the primary routing module is associated with a first network device and the redundant routing module is associated with a second network device different than the first network device.

In a fifth implementation, alone or in combination with one or more of the first through fourth implementations, the signed certificate chain includes a signed trust anchor certificate chain.

In a sixth implementation, alone or in combination with one or more of the first through fifth implementations, verifying the signed certificate chain comprises verifying a signature of the network device included in the signed certificate chain.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
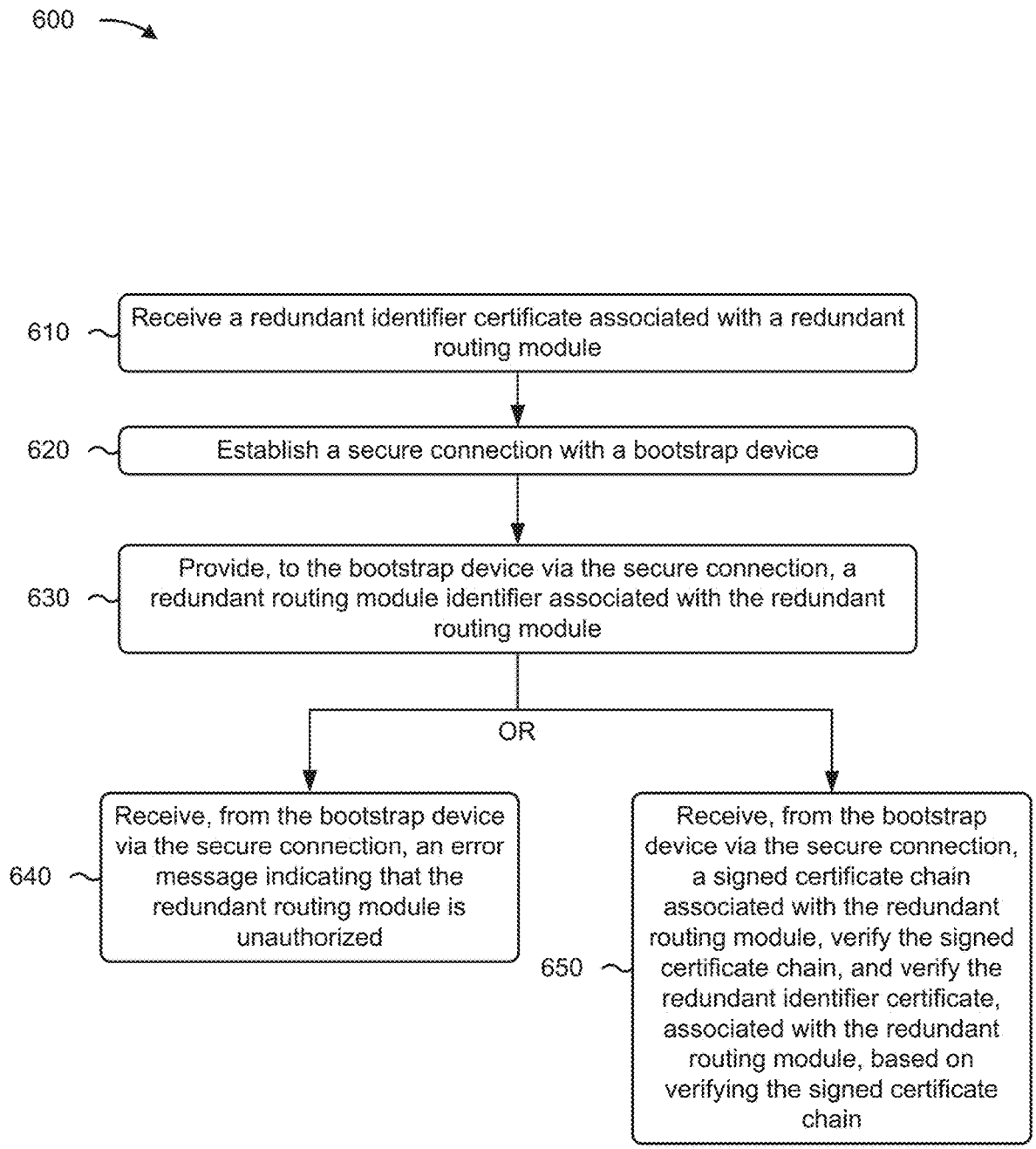

FIG. 6 is a flow chart of an example process 600 associated with facilitating authentication of routing modules associated with one or more network devices to allow zero touch provisioning. In some implementations, one or more process blocks of FIG. 6 may be performed by a network device (e.g., network device 210-1). In some implementations, one or more process blocks of FIG. 6 may be performed by another device or a group of devices separate from or including the network device, such as another network device (e.g., network device 210-2, network device 210-N, and/or the like), a bootstrap device (e.g., bootstrap device 220), and/or the like. Additionally, or alternatively, one or more process blocks of FIG. 6 may be performed by one or more components of a device 300, such as input component 310, switching component 320, output component 330, controller 340, and/or the like; a device 400, such as processor 420, memory 430, storage component 440, input component 450, output component 460, communication interface 470, and/or the like; and/or the like.

As shown in FIG. 6, process 600 may include receiving a redundant identifier certificate associated with a redundant routing module (block 610). For example, the network device may receive a redundant identifier certificate associated with a redundant routing module, as described above.

As further shown in FIG. 6, process 600 may include establishing a secure connection with a bootstrap device (block 620). For example, the network device may establish a secure connection with a bootstrap device, as described above.

As further shown in FIG. 6, process 600 may include providing, to the bootstrap device via the secure connection, a redundant routing module identifier associated with the redundant routing module (block 630). For example, the network device may provide, to the bootstrap device via the secure connection, a redundant routing module identifier associated with the redundant routing module, as described above.

As further shown in FIG. 6, process 600 may include selectively receiving, from the bootstrap device via the secure connection, an error message indicating that the redundant routing module is unauthorized (block 640). For example, the network device may selectively receive, from the bootstrap device via the secure connection, an error message indicating that the redundant routing module is unauthorized, as described above.

Alternatively, as further shown in FIG. 6, process 600 may include selectively receiving, from the bootstrap device via the secure connection, a signed certificate chain associated with the redundant routing module, verifying the signed certificate chain, and verifying the redundant identifier certificate, associated with the redundant routing module, based on verifying the signed certificate chain (block 650). For example, the network device may selectively receive, from the bootstrap device via the secure connection, a signed certificate chain associated with the redundant routing module, verify the signed certificate chain, and verify the redundant identifier certificate, associated with the redundant routing module, based on verifying the signed certificate chain, as described above.

Process 600 may include additional implementations, such as any single implementation or any combination of implementations described below and/or in connection with one or more other processes described elsewhere herein.

In a first implementation, the secure connection is a secure sockets layer connection.

In a second implementation, alone or in combination with the first implementation, the network device and the redundant routing module are included in a virtual chassis that includes the network device and another network device, wherein the other network device performs functions of the redundant routing module.

In a third implementation, alone or in combination with one or more of the first and second implementations, process 600 includes determining, after verifying the redundant identifier certificate, that the network device is nonoperational and causing the redundant routing module to perform functions of the network device until the network device becomes operational.

In a fourth implementation, alone or in combination with one or more of the first through third implementations, the redundant routing module is associated with a line card of the network device.

In a fifth implementation, alone or in combination with one or more of the first through fourth implementations, the redundant identifier certificate is issued by one of a plurality of certificate authorities.

In a sixth implementation, alone or in combination with one or more of the first through fifth implementations, process 600 includes verifying the signed certificate chain via an owner certificate and an ownership voucher mechanism.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
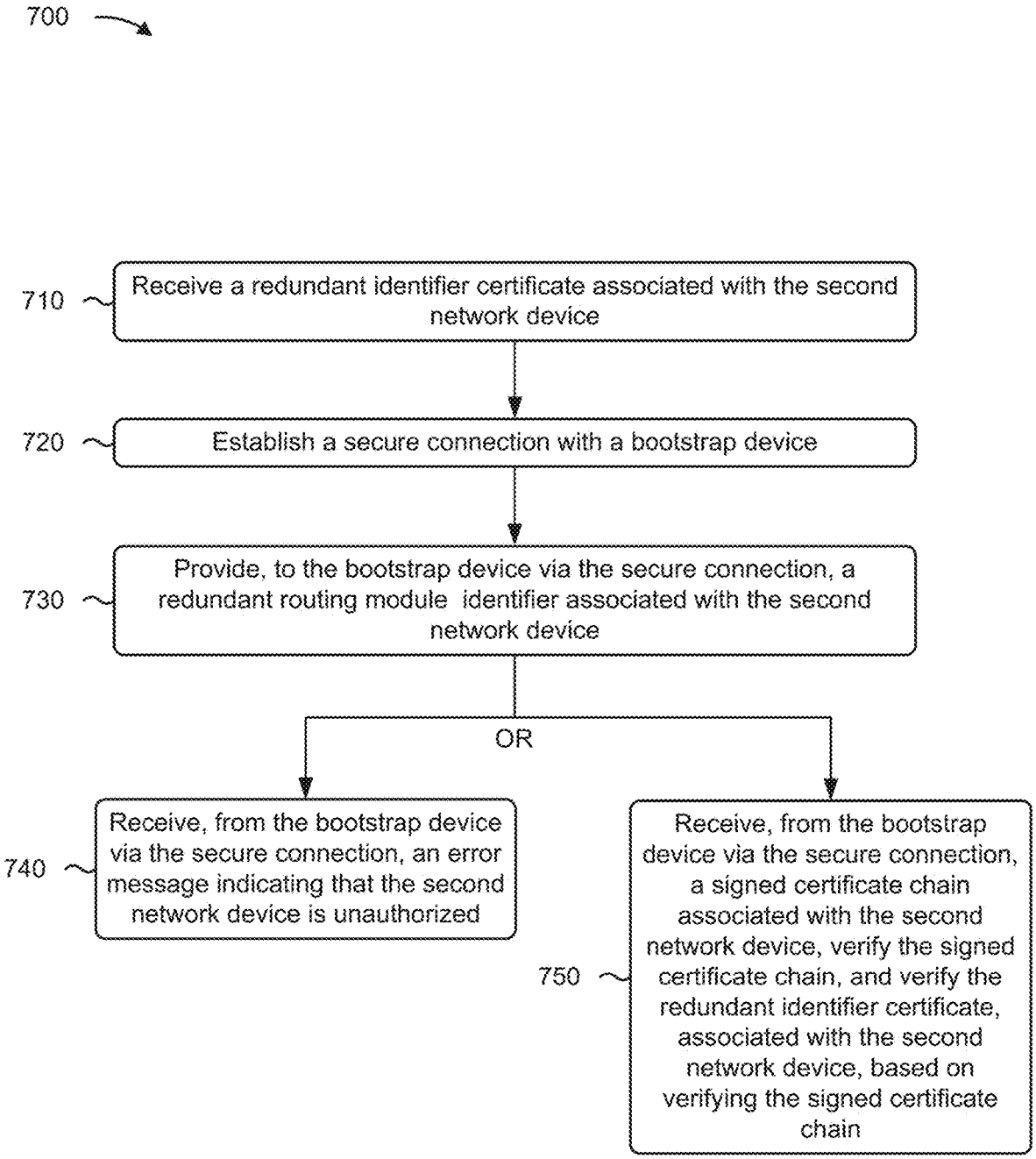

FIG. 7 is a flow chart of an example process 700 associated with facilitating authentication of routing modules associated with one or more network devices to allow zero touch provisioning. In some implementations, one or more process blocks of FIG. 7 may be performed by a first network device (e.g., network device 210-1) and/or a second network device (e.g., network device 210-2) that form a virtual chassis. In some implementations, one or more process blocks of FIG. 7 may be performed by another device or a group of devices separate from or including the network device, such as another network device (e.g., network device 210-3, network device 210-N, and/or the like), a bootstrap device (e.g., bootstrap device 220), and/or the like. Additionally, or alternatively, one or more process blocks of FIG. 7 may be performed by one or more components of a device 300, such as input component 310, switching component 320, output component 330, controller 340, and/or the like; a device 400, such as processor 420, memory 430, storage component 440, input component 450, output component 460, communication interface 470, and/or the like; and/or the like.

As shown in FIG. 7, process 700 may include receiving a redundant identifier certificate associated with the second network device (block 710). For example, the first network device and/or the second network device may receive a redundant identifier certificate associated with the second network device, as described above.

As further shown in FIG. 7, process 700 may include establishing a secure connection with a bootstrap device (block 720). For example, the first network device and/or the second network device may establish a secure connection with a bootstrap device, as described above.

As further shown in FIG. 7, process 700 may include providing, to the bootstrap device via the secure connection, a redundant routing module identifier associated with the second network device (block 730). For example, the first network device and/or the second network device may provide, to the bootstrap device via the secure connection, a redundant routing module identifier associated with the second network device, as described above.

As further shown in FIG. 7, process 700 may include selectively receiving, from the bootstrap device via the secure connection, an error message indicating that the second network device is unauthorized (block 740). For example, the first network device and/or the second network device may selectively receive, from the bootstrap device via the secure connection, an error message indicating that the second network device is unauthorized, as described above.

Alternatively, as further shown in FIG. 7, process 700 may include selectively receiving, from the bootstrap device via the secure connection, a signed certificate chain associated with the second network device, verifying the signed certificate chain, and verifying the redundant identifier certificate, associated with the second network device, based on verifying the signed certificate chain (block 750). For example, the first network device and/or the second network device may selectively receive, from the bootstrap device via the secure connection, a signed certificate chain associated with the second network device, verify the signed certificate chain, and verify the redundant identifier certificate, associated with the second network device, based on verifying the signed certificate chain, as described above.

Process 700 may include additional implementations, such as any single implementation or any combination of implementations described below and/or in connection with one or more other processes described elsewhere herein.

In a first implementation, process 700 includes preventing verification of the redundant routing module identifier when the error message is received from the bootstrap device.

In a second implementation, alone or in combination with the first implementation, process 700 includes receiving, by the first network device and from the bootstrap device, bootstrap information when the signed certificate chain is received.

In a third implementation, alone or in combination with one or more of the first and second implementations, the signed certificate chain includes a signed trust anchor certificate chain.

In a fourth implementation, alone or in combination with one or more of the first through third implementations, verifying the signed certificate chain includes verifying a signature of the second network device included in the signed certificate chain.

In a fifth implementation, alone or in combination with one or more of the first through fourth implementations, process 700 includes determining, after verifying the redundant identifier certificate, that the first network device is nonoperational; and causing the second network device to perform functions of the first network device until the first network device becomes operational.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    providing, by a primary routing module of a virtual chassis and to a bootstrap device, a redundant routing module identifier associated with a redundant routing module of the virtual chassis; and
    selectively performing a first series of operations or a second series of operations based on whether the redundant routing module is authorized to receive bootstrap information,
        wherein the first series of operations is performed, when the redundant routing module is unauthorized to receive the bootstrap information, includes:
            receiving, by the primary routing module and from the bootstrap device, an error message indicating that the redundant routing module is unauthorized based on no certificate associated with the redundant routing module being identified,
        wherein the second series of operations, performed when the redundant routing module is authorized to receive the bootstrap information, includes:
            receiving, by the primary routing module and from the bootstrap device, a signed certificate that includes the redundant routing module based on the signed certificate being identified, and
            identifying, by the primary routing module, a redundant identifier certificate, associated with the redundant routing module, using the signed certificate.

2. The method of claim 1, wherein providing the redundant routing module identifier comprises:
    providing the redundant routing module identifier to the bootstrap device via a secure connection between the primary routing module and the bootstrap device.

3. The method of claim 1, wherein the certificate is a trust anchor certificate chain.

4. The method of claim 1, wherein the first series of operations, performed when the redundant routing module is unauthorized to receive the bootstrap information based on no certificate associated with the redundant routing module being identified, further includes:
    preventing verifying an authenticity of the redundant routing module based on the error message.

5. The method of claim 1, wherein the first series of operations, performed when the redundant routing module is unauthorized to receive the bootstrap information based on no certificate associated with the redundant routing module being identified, includes:
    preventing the redundant routing module from being provisioned with the bootstrap information based on the error message.

6. The method of claim 1, further comprising:
receiving the signed certificate via a secure connection between the primary routing module and the bootstrap device.

7. The method of claim 1, wherein the second series of operations, performed when the redundant routing module is authorized to receive the bootstrap information based on the signed certificate being identified, further includes:
verifying the signed certificate to determine that the signed certificate originated from a network device.

8. A network device, comprising:
one or more memories; and
one or more processors to:
provide, to a bootstrap device, a redundant routing module identifier associated with a redundant routing module,
wherein a virtual chassis includes the network device and the redundant routing module; and
selectively perform a first series of operations or a second series of operations based on whether the redundant routing module is authorized to receive bootstrap information,
wherein the first series of operations, performed when the redundant routing module is unauthorized to receive the bootstrap information, includes:
receive, from the bootstrap device, an error message indicating that the redundant routing module is unauthorized,
wherein the second series of operations, performed when the redundant routing module is authorized to receive the bootstrap information, includes:
receive, from the bootstrap device, a signed certificate associated with the network device that includes the redundant routing module, and
identify a redundant identifier certificate, associated with the redundant routing module, using the signed certificate.

9. The network device of claim 8, wherein the second series of operations, performed when the redundant routing module is authorized to receive the bootstrap information based on the signed certificate associated with the redundant routing module being identified, further includes:
perform a reboot procedure to address an operational error; and
cause the redundant routing module to perform one or more functions until a primary routing module becomes operational again.

10. The network device of claim 8, wherein the one or more processors are further to:
receive the signed certificate chain signed by the network device via a secure connection between a primary routing module and the bootstrap device.

11. The network device of claim 8, wherein the first series of operations, performed when the redundant routing module is unauthorized to receive the bootstrap information based on no certificate associated with the redundant routing module being identified, includes:
prevent the redundant routing module from being provisioned with the bootstrap information based on the error message.

12. The network device of claim 8, wherein the second series of operations, performed when the redundant routing module is authorized to receive the bootstrap information based on the signed certificate associated with the redundant routing module being identified, further includes:
send the bootstrap information to the redundant routing module.

13. The network device of claim 8, wherein the second series of operations, performed when the redundant routing module is authorized to receive the bootstrap information based on the signed certificate associated with the redundant routing module being identified, further includes:
perform one or more routing functions based on the bootstrap information.

14. The network device of claim 8, wherein the one or more processors, to provide the redundant routing module identifier, are to:
provide the redundant routing module identifier to the bootstrap device via a secure connection between a primary routing module and the bootstrap device.

15. A non-transitory computer-readable medium storing instructions, the instructions comprising:
one or more instructions that, when executed by one or more processors of a first network device and a second network device that form a virtual chassis, cause the one or more processors to:
provide, to a bootstrap device, a redundant routing module identifier associated with a redundant routing module; and
selectively perform a first series of operations or a second series of operations based on whether the redundant routing module is authorized to receive bootstrap information,
wherein the first series of operations, performed when the redundant routing module is unauthorized to receive the bootstrap information includes:
receiving, by a primary routing module and from the bootstrap device, an error message indicating that the redundant routing module is unauthorized based on no certificate associated with the redundant routing module being identified,
wherein the second series of operations, performed when the redundant routing module is authorized to receive the bootstrap information includes:
identifying, by the primary routing module, a redundant identifier certificate associated with the redundant routing module based on a signed certificate associated with the redundant routing module being identified.

16. The non-transitory computer-readable medium of claim 15, wherein the first series of operations, performed when the redundant routing module is unauthorized to receive the bootstrap information based on no certificate associated with the redundant routing module being identified, includes:
prevent the redundant routing module from being provisioned with the bootstrap information based on the error message.

17. The non-transitory computer-readable medium of claim 15, wherein the second series of operations, performed when the redundant routing module is authorized to receive the bootstrap information based on the signed certificate associated with the redundant routing module being identified, further includes:
receive the bootstrap information sent from the bootstrap device via a secure channel.

18. The non-transitory computer-readable medium of claim 15, wherein the second series of operations, performed when the redundant routing module is authorized to receive the bootstrap information based on the signed certificate associated with the redundant routing module being identified, further includes:

send the bootstrap information to the redundant routing module.

19. The non-transitory computer-readable medium of claim 15, wherein the second series of operations, performed when the redundant routing module is authorized to receive the bootstrap information based on the signed certificate associated with the redundant routing module being identified, further includes:
perform one or more routing functions based on the bootstrap information.

20. The non-transitory computer-readable medium of claim 15, wherein the second series of operations, performed when the redundant routing module is authorized to receive the bootstrap information based on the signed certificate associated with the redundant routing module being identified, further includes:
establish a new connection with the redundant routing module to re-obtain the redundant identifier certificate.

* * * * *